United States Patent [19]
Dean

[11] Patent Number: 5,850,906
[45] Date of Patent: Dec. 22, 1998

[54] BI-DIRECTIONAL, DIFFERENTIAL MOTION CONVEYOR

[75] Inventor: Arthur L. Dean, Indiana, Pa.

[73] Assignee: FMC Corporation, Chicago, Ill.

[21] Appl. No.: 691,993

[22] Filed: Aug. 2, 1996

[51] Int. Cl.⁶ .............................................. B65G 25/00
[52] U.S. Cl. .................................... 198/750.8; 198/750.1
[58] Field of Search ............................. 198/750.1, 750.8, 198/750.7, 759, 762

[56] References Cited

U.S. PATENT DOCUMENTS

| | | | |
|---|---|---|---|
| 3,099,348 | 7/1963 | Algatt et al. ............................. | 198/750.8 |
| 3,253,700 | 5/1966 | Allen et al. . | |
| 3,567,012 | 3/1971 | Mendoza . | |
| 4,339,029 | 7/1982 | Wilson ..................................... | 198/750.8 |
| 4,418,816 | 12/1983 | Kropp ....................................... | 198/773 |
| 4,793,196 | 12/1988 | Davis et al. ................................ | 74/61 |
| 5,054,606 | 10/1991 | Musschoot . | |
| 5,131,525 | 7/1992 | Musschoot ................................ | 198/770 |
| 5,277,281 | 1/1994 | Carlson et al. ........................... | 188/267 |
| 5,284,330 | 2/1994 | Carlson et al. ...................... | 267/140.14 |
| 5,351,807 | 10/1994 | Svejkovsky . | |
| 5,382,373 | 1/1995 | Carlson et al. ......................... | 252/62.55 |
| 5,392,898 | 2/1995 | Burgess ................................... | 198/750 |
| 5,398,917 | 3/1995 | Carlson et al. ...................... | 267/140.14 |
| 5,492,312 | 2/1996 | Carlson . | |
| 5,690,567 | 11/1997 | DeNiss et al. ..................... | 198/750.1 X |
| 5,699,897 | 12/1997 | Svejkovsky ............................. | 198/750.8 |

FOREIGN PATENT DOCUMENTS

| | | |
|---|---|---|
| 354571 | 8/1931 | United Kingdom . |
| 824999 | 12/1959 | United Kingdom . |
| 926120 | 5/1963 | United Kingdom . |
| 933748 | 8/1963 | United Kingdom . |
| 1069686 | 5/1967 | United Kingdom . |
| 2005380 | 4/1979 | United Kingdom ........... B65G 27/32 |

OTHER PUBLICATIONS

J.D. Carlson and K.D. Weiss, *A Growing Attraction to Magnetic Fluids*, Machine Design, Aug. 8, 1994.
Triple/S Dynamics, Inc. *Slipstick Horizontal Motion Conveyor Application Design Guide*, Dallas, TX.
Triple/S Dynamics, Inc. *SlipStick vs. Natural Frequency Conveyors* 1991.
Triple/S Dynamics, Inc. *SlipStick Conveyors*, Dallas, TX.
FEC, *The Ideal System For Handling Fragile And Delicate Products, X–Force Conveyor*, Minneaplis, MN.
Undersea Transducer Technology, Inc. *UTT Sona–Tool* Ventura, CA.

*Primary Examiner*—James R. Bidwell

[57] ABSTRACT

There is provided a differential motion conveyor comprising a trough and a conveyor drive. The conveyor drive comprises a clutch/brake assembly which is selectively activated for moving the trough at a first speed in a first direction and selectively deactivated when moving the trough at a second speed in an opposite direction. There is further provided a method of conveying material comprising sensing a position of a trough, activating a clutch/brake assembly when the trough is at a first position for moving the trough at a first speed in a first direction, and deactivating a clutch/brake assembly when the trough is at a second position for moving the trough at a second faster speed in a second opposite direction to the first direction.

20 Claims, 3 Drawing Sheets

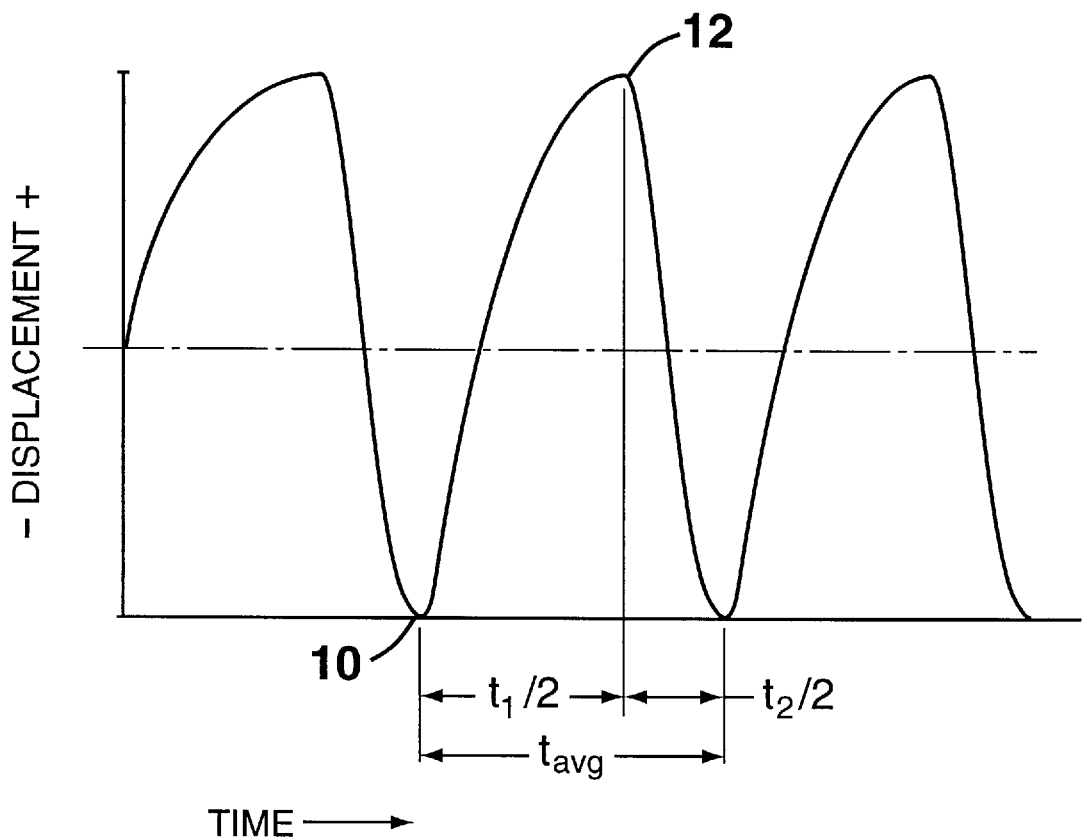
FIG_1

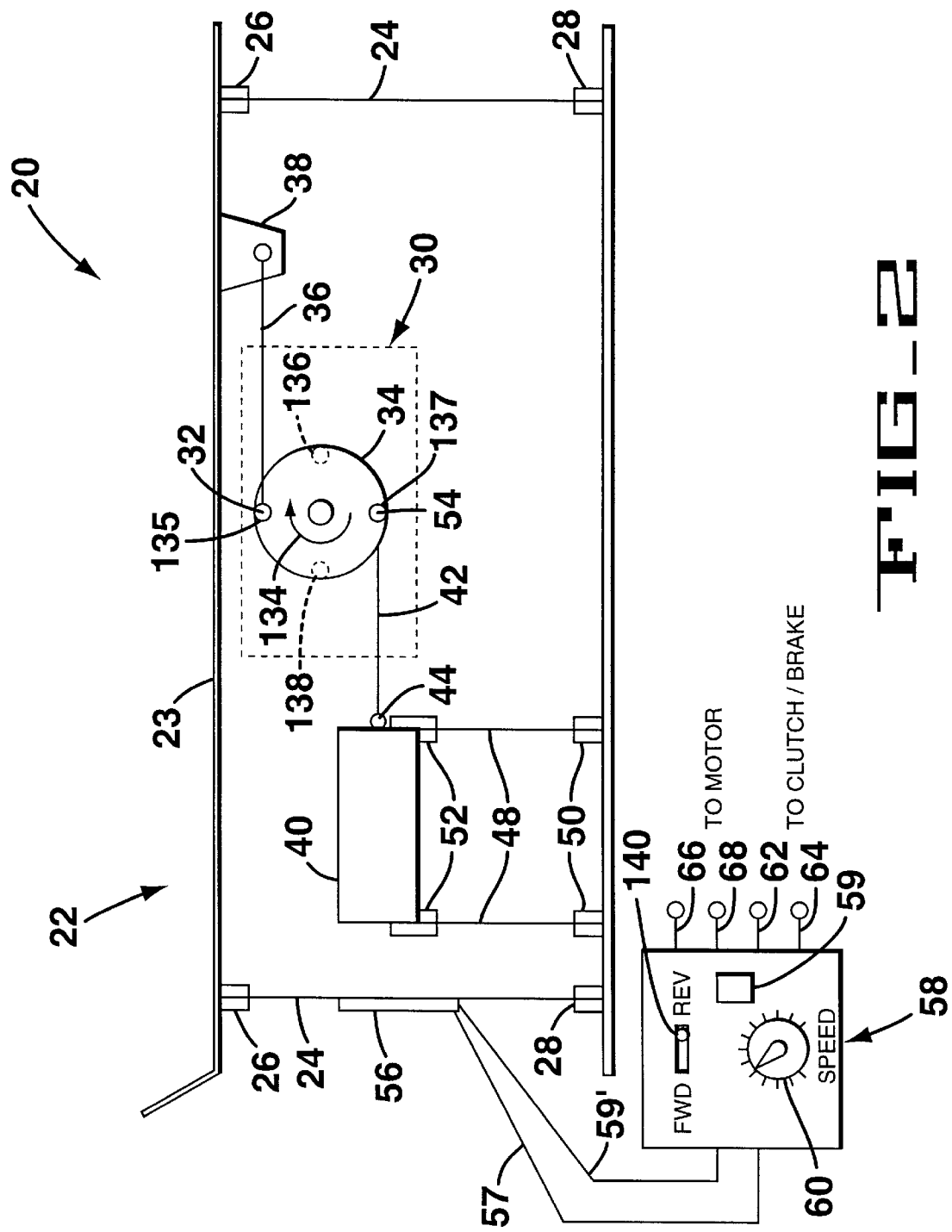
FIG_2

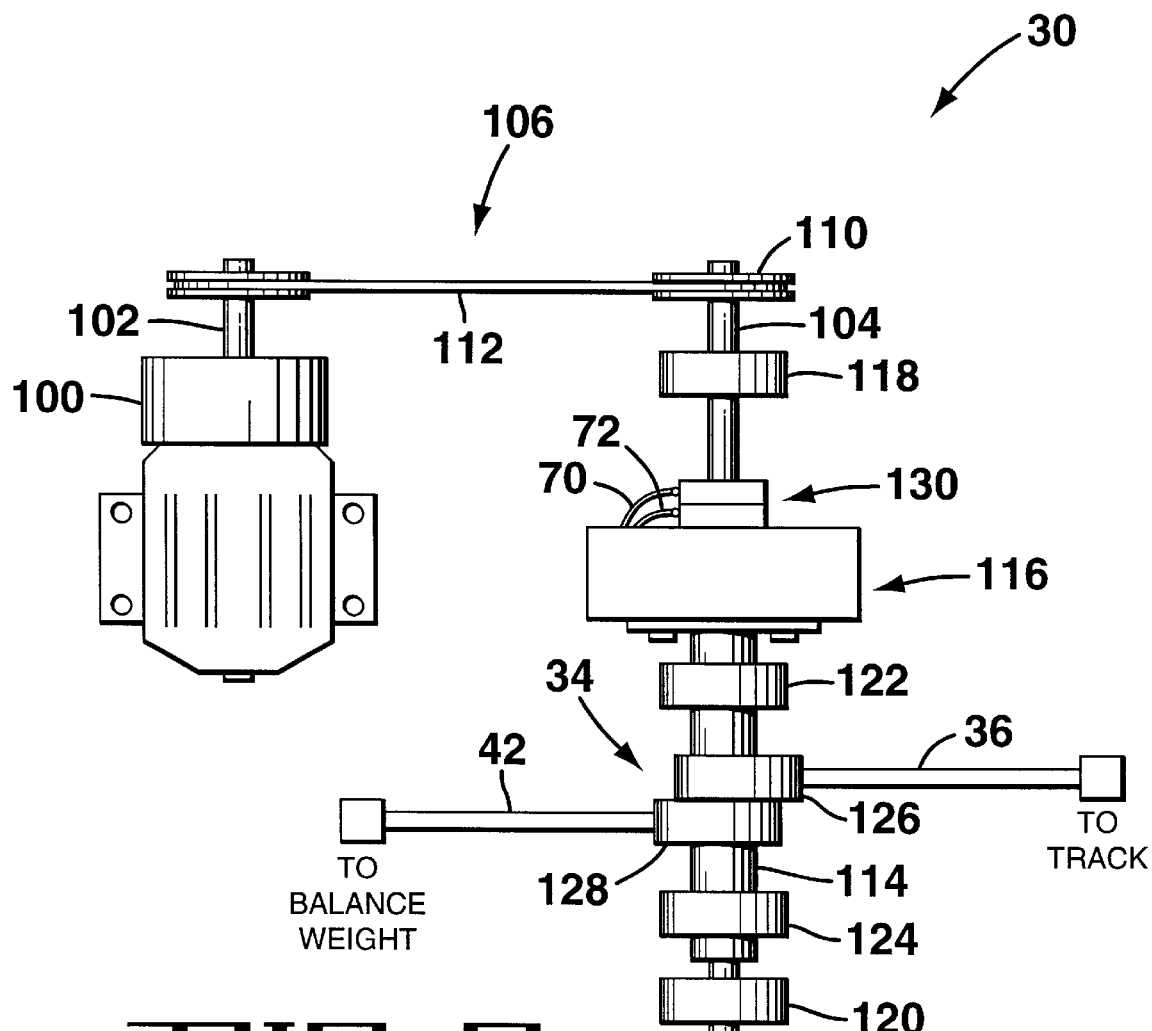
FIG_3
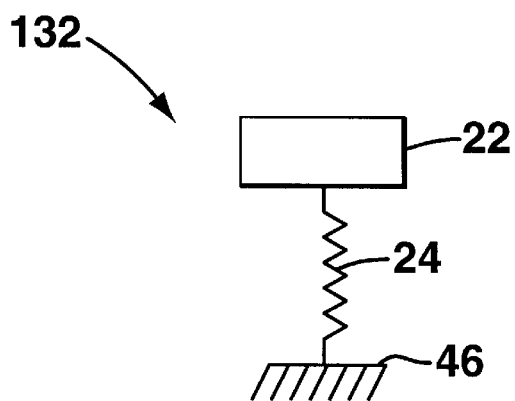
FIG_4

5,850,906

BI-DIRECTIONAL, DIFFERENTIAL MOTION CONVEYOR

BACKGROUND OF THE INVENTION

1. Field of the Invention

This invention relates to equipment for conveying bulk material and more particularly to differential motion conveyors.

2. Description of Related Art

Differential motion conveyors may be used for conveying bulk material such as snack food and the like. Unlike vibratory conveyors in which the forces to convey the material have both horizontal and vertical components, the forces for differential motion conveyors are applied only in horizontal directions. It is for this reason that this class of conveyors is often referred to as horizontal motion conveyors. It is generally perceived that differential motion conveyors feed material in a more gentle manner and with less build up than vibratory conveyors.

Referring to FIG. 1, there is shown a plot of displacement versus time for a differential motion conveyor. In a differential motion conveyor, the conveying surface is displaced horizontally from a negative displacement point 10 to a positive displacement point 12 at one speed and returns from point 12 to point 10 at a faster speed. Particles on the conveying surface are subject only to the normal force due to gravity and the coefficient of friction between the particle and conveying surface. Since the time to get from point 10 to point 12 is longer than it takes to get from point 12 to point 10, there is a net movement of the particles in the slow speed direction.

Prior art differential motion conveyors may, for example, employ a four shaft linear exciter in which two different sets of counter rotating weights create a mechanism that produces a linear force with a greater magnitude in one direction than in the other. Companies such as Triple S Dynamics, FEC, and General Kinematics, for example, provide four shaft linear exciters. However, a four shaft exciter may be bulky, relatively expensive, and difficult to isolate the motion from the support structure. Further, four shaft linear exciters may require greater maintenance.

Another prior art device disclosed in U.S. Pat. No. 5,351,807 to Svejkovsky which is incorporated herein by reference utilizes a universal joint driven off axis to generate differential motion. However, such a construction may be limited in size and utilizes a damper in the form of a hydraulic brake to eliminate inertial load backlash at the speed transition points. U.S. Pat. No. 3,253,700 to Allen which is incorporated herein by reference further discloses a differential motion conveyor utilizing elliptical gears to provide differential motion. However, such a construction may require a damper to eliminate backlash caused by the inertial loads as the conveyor stroke changes speed and direction. The backlash not only generates an undesirable noise, but may also damage the gear teeth as they make contact under such vibration. Further, the oil, required by the gears for lubrication, and the hydraulic fluid, if a hydraulic brake damper is used, is undesirable in a food processing environment from a sanitary aspect, should a leak occur.

Dynamic simulation shows that at the speeds where the equipment normally operates, slippage between the particle and conveying surface occurs in both directions of the displacement. At any one average speed of the conveyor, the greater the displacement, the better the feed rate at that speed. The slippage is also impacted by the coefficient of friction between the particle and the conveying surface and as a result, some materials may feed better than others. However, the coefficient of friction is generally not a major influence on the feed rate. Therefore, speed and stroke may affect the feed rate of the conveyor. It is desirable to optimize the combination of speed and stroke for a differential motion conveyor so that the conveyor may convey material in a more efficient manner.

Certain applications for conveyors may also require the capability of being able to change the direction in which material is being fed. While some manufacturers offer equipment that has the capability of feeding material in either a forward or reverse direction, the equipment usually requires the operator to physically move a mechanism or may add a further degree of complexity to the drive mechanism adding to the cost of the drive mechanism. It is therefore desirable to have a conveyor which is capable of easily being able to change the direction in which material is being fed.

SUMMARY OF THE INVENTION

There is provided a differential motion conveyor comprising a trough and a conveyor drive. The conveyor drive comprises a clutch/brake assembly which is selectively activated for moving the trough at a first speed in a first direction and selectively deactivated when moving the trough at a second speed in an opposite direction.

There is also provided a differential motion conveyor comprising a trough, a sensor for sensing a position of the trough, a conveyor drive comprising a clutch/brake assembly, and a controller, wherein the controller activates the clutch/brake assembly for moving the trough at a first speed in a first direction and deactivates the clutch/brake assembly for moving the trough at a second faster speed in an opposite direction.

There is further provided a method of conveying material comprising sensing a position of a trough, activating a clutch/brake assembly when the trough is at a first position for moving the trough at a first speed in a first direction, and deactivating a clutch/brake assembly when the trough is at a second position for moving the trough at a second faster speed in a second opposite direction to the first direction.

BRIEF DESCRIPTION OF THE DRAWINGS

FIG. 1 is a plot of displacement versus time for a differential motion conveyor.

FIG. 2 is a schematic view of the differential motion conveyor of the present invention.

FIG. 3 is a top view of the conveyor drive provided in FIG. 2.

FIG. 4 is a schematic representation of the relationships controlling the natural frequency of the differential motion conveyor.

DESCRIPTION OF THE PREFERRED EMBODIMENTS

Referring to FIG. 2, there is shown a schematic view of the differential motion conveyor 20 of the present invention. The trough structure 22 comprising a trough 23 is supported by a spring system 24. The spring system 24 may comprise leaf springs mounted in a vertical position between a trough spring mounting bracket 26 and the support structure spring mounting bracket 28 as is standardly used in the industry. The leaf springs may be steel or reinforced plastic such as fiber glass or graphite. Alternatively, the springs 24 may be coil springs or elastomeric springs such as polyisoprene springs. In addition to the trough 23, the trough structure 22 comprises the spring mounting brackets 28. The trough structure 22 further comprises all of the structural members that add up to the total weight of the conveyor such as stiffening ribs, drive coupling brackets, and reinforcing members, not shown, as is known in the industry.

The conveyor drive 30 is connected to the trough 23 at point 32 on the eccentric crank 34 via crank arm 36 through trough mounting bracket 38. A counter weight 40 which is sized to balance the horizontal inertial forces of the moving trough 23 is attached to a second crank arm 42 and eccentric crank 34 by the use of a counter weight mounting bracket 44. The second crank arm 42 is preferably one hundred eighty degrees out of phase with the first crank arm 36. The counter weight 40 may be connected to a support structure 46 by springs 48 mounted between support structure spring mounting brackets 50 and the counter weight spring mounting brackets 52 as is standardly done in the industry. The counter weight crank arm 42 may be connect to point 54 on the eccentric crank 34 which may be one hundred eighty degrees away from point 32. This allows the counter weight 40 to move one hundred eighty degrees out of phase from the trough motion. As a result, horizontal forces may be balanced for isolation purposes.

A sensor or transducer 56 may be connected to the springs 24. Alternatively, the sensor or transducer 56 may be connected to the trough structure 22, not shown. The output voltage of the transducer 56 is connected to the controller 58 by means of two wires 57 and 59. The transducer 56 outputs a voltage having a value proportional to the displacement of the trough 23 and a polarity defining its direction of deflection and therefore the direction of feed of the conveyor 20. Preferably, the transducer 56 is fabricated from piezoelectric plastic film. Where a piezoelectric transducer is used, when the spring 24 is deflected in one direction, a positive voltage is produced and when it is deflected in an opposite direction, a negative voltage is produced. The transducer 56 may, for example, be transducer part numbers LDT1-028K, LDT2-028K, LDT3-028K, and LDT4-028K manufactured by Atochem Sensors Inc. Where, for example, the size of the conveyor 20 is small and the space available to mount the transducer 56 is limited, then the Atochem Sensors part number LDT1-028K may be used.

The output of the transducer 56 may be connected to a controller 58. The controller 58 may, for example, be a UMC1, CMC1, or CMC2 controller manufactured by FMC Corporation, applicant's assignee. Preferably, the controller 58 utilizes a microcontroller 59, such as a Motorola 68HC11 microcontroller. The output of the transducer 56 may be connected to one of the A/D converters on the Motorola 68HC11 microcontroller 59. Further, the output of the transducer 56 may be suitably conditioned to produce a zero to five volt signal representative of the plus and minus voltage signal output of the transducer and may be buffered prior to entering the A/D converter of the Motorola 68HC11 microcontroller 59.

The controller 58 also comprises a potentiometer 60. The potentiometer 60 may be connected to another A/D input of the 68HC11 microcontroller 59 and serves as a set point to electronically control the stroke from a minimum to a maximum value. As will be described, the microcontroller 59 compares the potentiometer 60 set point to the input provided by the transducer 56.

Referring now to FIG. 3, there is shown a top view of the conveyor drive 30 provided in FIG. 2. The conveyor drive 30 comprises a gear motor 100 having an output shaft 102, a drive shaft 104, and a belt transmission means 106 connecting the output shaft 102 to the drive shaft 104. The belt transmission means 106 may, for example, comprise a first pulley 108 disposed around the output shaft 102, a second pulley 110 disposed around the drive shaft 104, and a drive belt 112 disposed around the first pulley 108 and the second pulley 110. Lines 66 and 68 from the controller 58 represent output wires to the motor 100 so that the controller 58 can turn the motor 100 on or off when desired. The motor 100 may be a single phase gear motor. Alternately, a three phase gear motor may be utilized.

The conveyor drive 30 further comprises a transmission shaft 114 and a clutch/brake assembly 116. The drive shaft 104 may be connected to the transmission shaft 114 through the clutch/brake assembly 116. That is, when the clutch/brake assembly 116 is engaged, the drive shaft 104 is coupled to the transmission shaft 114. This causes the transmission shaft 114 to rotate with the drive shaft 104. Preferably, the transmission shaft 114 is bored to fit co-axially over the drive shaft 104 with ample clearance so that the transmission shaft 114 is also free to rotate smoothly.

The drive shaft 104 may be supported by bearings 118 and 120. Further, the transmission shaft 114 may be supported by bearings 122 and 124. The bearings 118,120,122, and 124 may, for example, be spherical roller bearings P3-U220N mounted in pillow blocks manufactured by PTC Components Inc. of Indianapolis, Ind. Moreover, the eccentric crank 34 comprises eccentric bearings 126 and 128. The eccentric bearings 126 and 128 are mounted to the transmission shaft 114 and are attached to the crank arms 36 and 42. The eccentric bearings 126 and 128 may, for example, be spherical roller bearing flanged cartridge units FCB22440H manufactured by PTC Components Inc. The spherical roller bearing flanged cartridge units FCB22440H may be fitted over eccentricities which may be machined on transmission shaft 114 as is standardly done in the industry. This drives the trough 23 and the counterweight 40 causing them to be displaced respectively when the transmission shaft 114 is rotated.

The clutch/brake assembly 116 may be a controllable viscosity fluid clutch/brake device and is preferably a magnetorheological fluid device. Preferably, the clutch/brake assembly 116 is an MRB-1000 magnetorheological fluid device manufactured by Lord Corporation of Erie, Pa. Alternatively, the clutch/brake assembly 116 may be made in accordance with U.S. Pat. No. 5,492,312 assigned to Lord Corporation and which is incorporated herein by reference. The clutch/brake assembly 116 may have a torque rating of one hundred fifty foot-pounds. The clutch/brake assembly 116 comprises a slip ring assembly 130 which collects the control power to engage the coupling. Wires 70 and 72 connect to a control coil, not shown, disposed in the clutch/brake assembly 116 and terminate at the slip rings 130, enabling the clutch/brake assembly 116 to rotate with the drive shaft 104. Brushes, not shown, contacting the slip rings 130 connect the control coil to the controller 58 by wires 62 and 64. When employing the Lord Corporation MRB-1000 magnetorheological fluid device, the control power is at a maximum of three amperes at twelve volts to develop the torque rating of one hundred fifty foot-pounds.

It is desirable to optimize the speed and stroke so that the particles disposed on the trough 23 may be conveyed efficiently. Referring back to FIG. 1, there is shown $t_{avg}$ which is the average total conveyor cycle time. The average cycle time $t_{avg}$ may be approximated by the equation:

$$t_{avg} = (t_1 + t_2)/2$$

where the term $t_1$ represents the time of the slow portion of the conveyor cycle and the term $t_2$ represents the time the fast portion of the conveyor cycle. Further, the relationship between $t_1$ and $t_2$ may be approximated by the following relationship:

$$t_1 = Rt_2$$

where R represents the ratio between the slow portion of the conveyor cycle and the fast portion of the conveyor cycle. As a result, the values for $t_1$ and $t_2$ may be approximated by the following equations:

$$t_1 = 2t_{avg}R/(1+R), \text{ and}$$

$$t_2 = 2t_{avg}/(1+R).$$

Because $t_{avg}$, $t_1$, and $t_2$ are defined as a time period per cycle and because speed may be defined in terms of cycles per time period, the equivalent speed for each of $t_{avg}$, $t_1$, and $t_2$ is merely the inverse of these values. That is, the average speed $s_{avg}$, the equivalent slow speed $S_1$, and the equivalent fast speed $S_2$ are related to $t_{avg}$, $t_1$, and $t_2$, respectively, as follows:

$$s_{avg} = 1/t_{avg}$$
$$s_1 = 1/t_1, \text{ and}$$
$$s_2 = 1/t_2.$$

As a result, $$s_1 = s_{avg}(1+R)/2R, \text{ and}$$

$$s_2 = s_{avg}(1+R)/2.$$

In a preferred embodiment, the factor R is 2.43 and $t_{avg}$ is 0.286 seconds (i.e., 0.286 seconds per cycle), $t_1$ is approximately 0.405 seconds, and $t_2$ is approximately 0.167 seconds. The value of R was selected by running simulations to provide the optimum speed difference for the maximum feed rate. The value of R being 2.43 may apply to all two shaft linear exciters. As a result, $s_{avg}$ is approximately 210 cpm, $s_1$ is approximately 148 cpm, and $s_2$ is approximately 360 cpm. Because the above-noted equations provide the relationship between speed components of the conveyor displacement (i.e., stroke), then the speed and stroke may be optimized by operating the conveyor 20 at the speed provided by these equations.

The slow portion of the conveying stroke is generated through the use of the gear motor 100. The speed of the gear motor 100 may be defined by the value $s_1$, and in the case of the embodiment referred to above is 148 cpm. That is, the value s1 may be approximated by the speed of the gear motor 100. Referring also to FIG. 4, the fast portion of the stroke is generated by a spring-mass system 132 formed from the trough structure 22 and the springs 24 connected between trough structure 22 and the conveyor support structure 46.

Preferably, the spring-mass system 132 is tuned to have a natural frequency $N_o$ close to the desired speed defined by $S_2$ which is approximately 360 cpm in the illustrated example. The relationship for the natural frequency $N_o$ is approximated by the following equation:

$$N_o = (M/K)^{1/2}$$

where M is the mass of the trough structure 22 and K is the spring constant of the springs 24.

The spring-mass system 132 may be turned to a desired speed by adding or subtracting springs of varying thickness to adjust the spring constant K, by adding or subtracting tuning weights to the trough structure 22, by altering the trough mass M, or by a combination of all of the above. As a result, the value for $s_2$ may be approximated by the natural frequency $N_o$ of the spring-mass system 132.

The transducer 56 monitors the position of the trough 23 at all times and provides this input to the control 58 to engage or disengage the clutch/brake assembly 116 at the appropriate time in the cycle. Specifically, the transducer 56 senses position of the trough 23 and sends the information via lines 57 and 59 to the microcontroller 59 housed in controller 58. The potentiometer 60 provides the microcontroller 59 with set points corresponding to positions reflecting the positive and negative displacement of the trough 23.

The set point is a reference that the controller 58 uses to determine the stroke of the conveyor trough 23. The value of the set point may be adjusted to represent the operating stroke anywhere over the entire range of the conveyor stroke. The output of the transducer 56, representing actual trough stroke, is compared by the microcontroller 59 with the set point value provided to the microcontroller by the potentiometer 60. A variable resistance provided by the potentiometer 60 represents the stroke range, from a minimum stroke (zero resistance) to a maximum stroke (maximum resistance). The clutch/brake assembly 116 is operated to adjust the stroke of the conveyor to bring it in line with that of the set point, if they are different. The set point is adjusted by the operator to obtain a desired trough stroke. That is, once the transducer 56 senses that the conveyor is in the stroke position as set by the potentiometer 60 setting, the controller 58 either engages the clutch/brake assembly 116 in one direction or re-engages the clutch/brake assembly 116 in the opposite direction.

When the trough 23 is at a location corresponding to the set point for the most positive displacement, the microcontroller 59 sends a signal via line 62 to deactivate the clutch/brake assembly 116. When the trough 23 is at a location corresponding to the set point for the most negative displacement, the microcontroller 59 sends a signal via line 62 to activate the clutch/brake assembly 116. As stated above, the most positive and negative displacement are set by the potentiometer 60.

With the conveyor 20 at rest, the crank arm 36 may, for example, be at position 135 with respect to the eccentric crank 34. On start up, the clutch/brake assembly 116 is engaged and the eccentric crank 34 rotates the crank arm 36 in a clockwise direction as noted by arrow 134 to position 136. Specifically, the motor 100 drives the transmission shaft 114 which is connected by the eccentric crank arm 36 to the trough 23 when the clutch/brake assembly 116 is engaged. At this position 136, the conveyor 20 is at the maximum stroke. Because the speed of the output shaft in the example provided is 148 cpm and because the clutch/brake assembly 116 is engaged, the eccentric crank 34 rotates the crank arm 36 toward position 136 at the maximum speed Si of the motor 100 or 148 cpm.

At position 136, the clutch/brake assembly 116 is disengaged and the spring-mass system 132 returns the crank arm 36 in a counterclockwise rotation to approximately position 138 with respect to the eccentric crank 34 at the high speed or $s_2$. As stated earlier, preferably, $s_2$ is equivalent or approximately equivalent to the natural frequency $N_o$. The high speed in the example provided is 360 cpm. Preferably, positions 136 and 138 are ninety degrees each from position 135 when the potentiometer 90 is set at the maximum stroke (i.e., the maximum setting). At position 138, the clutch/brake assembly 116 is re-engaged and the trough is once again driven through position 32 toward position 136 and the cycle is repeated as the trough 23 oscillates back and forth.

The clutch/brake assembly 116 is engaged only for the slow portion of the stroke cycle where the trough 23 moves from a maximum negative displacement 10 to a maximum positive displacement 12. This time period for which the clutch/brake assembly 116 is engaged is defined as $t_1/2$.

As the trough 23 is driven in the direction defined by the rotation of the motor 100, it deflects the springs 24. At the maximum deflection defined by the eccentricity of the eccentric crank 34 and in keeping with the time envelop defined by $t_{avg}$, the clutch/brake assembly 116 is disengaged, allowing the energy stored in the springs 24 to return the trough to its original position. This time period for which the clutch/brake assembly 116 is disengaged is defined as $t_2/2$. As the trough 23 approaches the original position, the clutch/brake assembly 116 is again engaged, slowing the trough 23 down and reversing direction to repeat the conveyor cycle.

In short, during the initial start up, the clutch/brake assembly 116 is engaged from position 135 to 136. Thus, the trough 23 moves at a forward speed of $s_1$. At position 136, the clutch/brake assembly 116 is disengaged from position 136 through position 135 and then to position 138. As a result, the trough 23 moves at a rearward speed of $s_2$. At position 138, the clutch/brake assembly 116 is re-engaged and remains engaged through position 135 and then to position 136. The trough 23 now moves at the forward speed of $s_1$. The process of engaging the clutch/brake assembly 116 at position 138 and disengaging the clutch/brake assembly 116 at position 136 continues while the conveyor 20 is on.

Where, for example, the potentiometer 60 is set at the maximum setting, positions 136 and 138 would be ninety degrees from position 135. Where the potentiometer 60 is at 50% of the maximum setting, positions 136 and 138 would each be forty five degrees from position 135 rather than ninety degrees from position 135 at the maximum setting. That is, the clutch/brake assembly 116 would be engaged from −45 degrees relative to position 135 to +45 degrees relative to position 135. The clutch/brake assembly 116 would be disengaged from +45 degrees relative to position 135 to −45 degrees relative to position 135. Similarly, where the potentiometer 60 is at 25% of the maximum setting, positions 138 and 138 would each be 22.5 degrees from position 135.

The eccentricity of the crank arm 36 may, for example, be slightly more than one inch in length and thus the total stroke may be approximately two inches. The eccentricity may be adjusted to be a little more than half of the total stroke to allow for any slippage in the clutch/brake assembly 116. Since the actual trough stroke may be determined by the combination of the feedback signal 57, 59 provided by the transducer 56 and controller 58, the maximum operating stroke may be something less than that determined by the amount of eccentricity on the drive shaft. Loading on the trough 23, for example, may cause a slippage to occur (phase angle) between the driven shaft and the output shaft. Such slippage could be compensated for if the eccentricity was somewhat more than the maximum design stroke.

To reverse the direction of feed, a switch 140 may be provided on the controller 58. That is, the switch may be set on either a forward or reverse setting. The position that the switch 140 is in may be sensed by the software of the microcontroller 59. If, for example, the switch 140 is on, the intended feed direction is in the direction of rotation of the eccentric crank 34 (i.e., forward direction). If the switch is off, then the desired feed direction would be in an opposite direction (i.e., the reverse direction).

The feed direction may be reversed at any time in the conveyor cycle by engaging the clutch/brake assembly 116 long enough to allow the crank arm 34 to rotate to a position displaced one hundred eighty degrees from the forward or first feed direction with respect to the eccentric crank 34. The driven slow speed portion of the cycle may then be in the opposite direction and as a result, the feed direction is reversed.

Preferably, the switch 140 is turned to the off position prior to starting the conveyor 20. On start up, the clutch/brake assembly 116 is engaged and the eccentric crank 34 rotates the crank arm 36 from position 135 past position 136 and continues toward position 137 and then toward position 138. As a result, the crank arm 34 would rotate clockwise approximately two hundred seventy degrees with respect to the eccentric crank 34 where the potentiometer 60 was set to the maximum setting. Preferably, position 137 is one hundred eighty degrees from position 135. This displaces the trough 23 at the slow speed in the direction opposite to the direction 134 of rotation of the eccentric crank 34. As a result, the trough 23 is driven toward the point of maximum displacement 138 of the trough 23 and the spring 24 is deflected toward the point of maximum displacement 138, storing energy to return the trough 23 back through crank position 137 and close to position 136. The clutch/brake assembly 116 is disengaged when the point of maximum displacement 138 is reached. When the crank arm 36 is close to position 136, the clutch/brake assembly 116 is engaged and the process is repeated with the feed now in the opposite direction. The potentiometer 60 may similarly be set to less than 100% of the maximum stroke as was done in the forward direction discussed above. Further, should the conveyor 20 be turned off, the crank arm 34 would rest at position 137 when operating in the reverse feed direction.

Alternatively, the feed direction may be reversed by changing the direction of the gear motor 100 rotation. However, some gear motors have a preferred direction of rotation and for gear motors that allow changing of directions, the reversal of direction may shorten motor life. As a result, it is preferable that the feed direction be reversed by employing a switch 140 and allowing the clutch/brake assembly 116 to be engaged more than one hundred eighty degrees as described above.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. A differential motion conveyor comprising:

a trough; and a conveyor drive for reciprocating said trough, said conveyor drive comprising a clutch/brake assembly, said clutch/brake assembly being selectively activated for moving said trough at a first speed in a first direction and selectively deactivated when moving said trough at a second speed in an opposite direction.

2. The invention of claim 1 wherein said second speed is faster than said first speed.

3. The invention of claim 2 wherein said first speed is approximated by the equation $$s_{avg}(1+R)/2R, \text{ and}$$

said second speed is approximated by the equation $$s_{avg}(1+R)/2$$

where $s_{avg}$ is the average speed for a given conveyor cycle and R is a ratio between the time of a slow portion of said conveyor cycle and a fast portion of said conveyor cycle.

4. The invention of claim 3 wherein said second speed is approximately equal to a natural frequency of a spring-mass system of said differential motion conveyor, said natural frequency being approximated by the equation $$(M/K)^{1/2}$$

where M is the mass of a trough structure and K is the spring constant of the springs.

5. The invention of claim 1 wherein said clutch/brake assembly is a controllable viscosity fluid clutch/brake device.

6. The invention of claim 5 wherein said clutch/brake assembly is a magnetorheological fluid device.

7. The invention of claim 1 wherein said differential motion conveyor is bi-directional.

8. A differential motion conveyor comprising:

a trough;

a sensor for sensing a position of said trough;

a conveyor drive for reciprocating said trough, said conveyor drive comprising a clutch/brake assembly; and a controller;

wherein said controller activates said clutch/brake assembly for moving said trough at a first speed in a first direction and deactivates said clutch/brake assembly for moving said trough at a second faster speed in an opposite direction.

9. The invention of claim 8 wherein said clutch/brake assembly is a controllable viscosity fluid clutch/brake device.

10. The invention of claim 9 wherein said clutch/brake assembly is a magnetorheological fluid device.

11. The invention of claim 10 wherein said first speed is approximated by the equation $$s_{avg}(1+R)/2R, \text{ and}$$

said second speed is approximated by the equation $$s_{avg}(1+R)/2$$

where $s_{avg}$ is the average speed for a given conveyor cycle and R is a ratio between the time of a slow portion of said conveyor cycle and a fast portion of said conveyor cycle.

12. The invention of claim 11 wherein said second speed is approximately equal to a natural frequency of a spring-mass system of said differential motion conveyor, said natural frequency being approximated by the equation $$(M/K)^{1/2}$$

where M is the mass of a trough structure and K is the spring constant of the springs.

13. The invention of claim 10 wherein said differential motion conveyor is bi-directional.

14. A method of conveying material comprising:

reciprocating a trough:

sensing a position of said trough;

activating a clutch/brake assembly when said trough is at a first position for moving said trough at a first speed in a first direction; and deactivating a clutch/brake assembly when said trough is at a second position for moving said trough at a second faster speed in a second opposite direction to said first direction.

15. The method of claim 14 wherein said first speed is approximated by the equation $$s_{avg}(1+R)/2R, \text{ and}$$

said second speed is approximated by the equation $$s_{avg}(1+R)/2$$

where $s_{avg}$ is the average speed for a given conveyor cycle and R is a ratio between the time of a slow portion of said conveyor cycle and a fast portion of said conveyor cycle.

16. The method of claim 15 wherein said second speed is approximately equal to a natural frequency of a spring-mass system of said differential motion conveyor, said natural frequency being approximated by the equation $$(M/K)^{1/2}$$

where M is the mass of a trough structure and K is the spring constant of the springs.

17. The method of claim 14 wherein said clutch/brake assembly is a controllable viscosity fluid clutch/brake device.

18. The method of claim 14 wherein said clutch/brake assembly is a magnetorheological fluid device.

19. The method of claim 14 further comprising the step of engaging said clutch/brake assembly for more than 180 degrees with respect to an eccentric crank for reversing a feeding direction of said conveyor.

20. The invention of claim 19 wherein said step of engaging is approximately 270 degrees with respect to said eccentric crank.

* * * * *